April 25, 1933.  E. M. BALL  1,905,430
MANUFACTURE OF LAMINATED GLASS
Filed Feb. 8, 1929
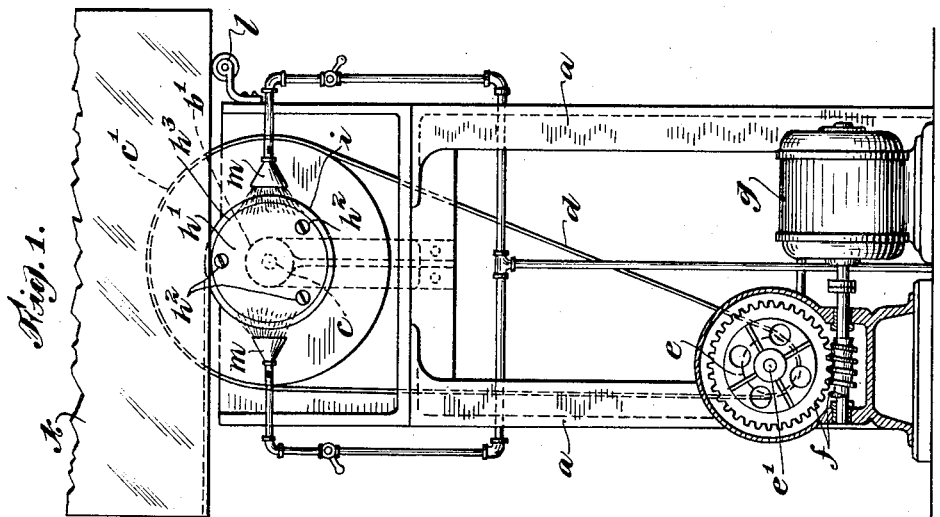
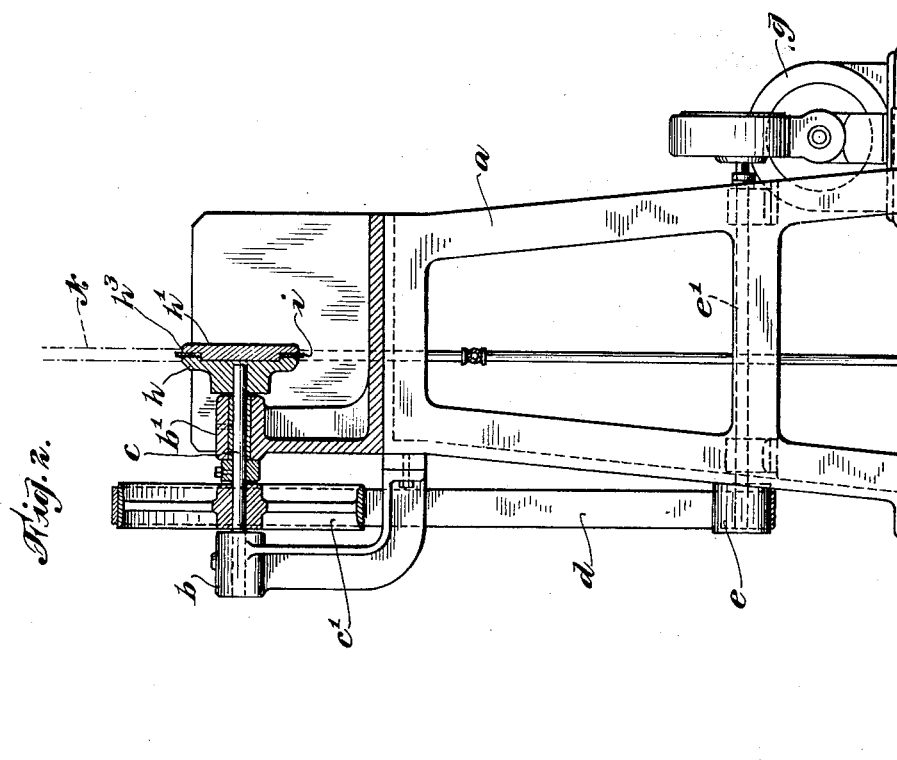
INVENTOR
Edward M Ball
BY
Redding, Greeley, O'Shea Campbell
ATTORNEYS Patented Apr. 25, 1933

1,905,430

UNITED STATES PATENT OFFICE

EDWARD M. BALL, OF BLOOMINGDALE, NEW JERSEY, ASSIGNOR, BY MESNE ASSIGNMENTS, TO LIBBEY-OWENS-FORD GLASS COMPANY

MANUFACTURE OF LAMINATED GLASS

Application filed February 8, 1929. Serial No. 338,572.

In the manufacture of laminated glass, in which a sheet of celluloid or similar transparent and non-brittle material is interposed between two sheets of glass to both of which it is strongly adherent, it has been found desirable to seal the edges of the laminated sheet with a sealing compound in order to prevent access of air, gases or moisture to the celluloid or other intersheet material so as to prevent possible deterioration or loosening of the intersheet. In the manufacture of the laminated glass the intersheet extends to the edge of the glass and it has been the general and most satisfactory procedure to remove the celluloid or other like material from between the edges of the two glass sheets to a slight depth and then to fill the crevice thus formed with the sealing material. Because of the nature of the material to be removed and of the extreme narrowness of the space between the two sheets of glass the removal of the intersheet to the required depth has been accomplished hitherto only with difficulty and at the expenditure of an amount of time and labor which has been a material item of cost in the production of the laminated glass. It has been proposed to effect the removal of the intersheet to the required depth, without previous treatment of the intersheet, by scraping tools in the hands of workmen, but this procedure requires much time and the complete removal of the intersheet to the required depth is often imperfectly accomplished. It has also been proposed to place the laminated sheet for a time in a bath of a suitable solvent by which the intersheet is softened to the required depth so that it can be removed more easily with scrapers in the hands of workmen, but the soaking of the laminated sheet in the bath of solvent itself requires considerable time, so that the expense is still considerable. It has also been proposed to remove the intersheet to the required depth by the use of circular saws or band saws, but such saws are necessarily very thin and are subject to frequent breakage, besides which this method results in considerable breakage of the glass and particles of the intersheet often are left in the crevice, requiring the expenditure of more time and labor for their removal.

It has been found in the development of the present invention, that the intersheet, particularly in the case of celluloid, can be removed rapidly and completely by the application of a sufficient degree of heat to effect destruction or disintegration of the intersheet to the required depth. Such destruction can be accomplished by different means, but it has been found that it can be accomplished most expeditiously and effectively by the use of a thin plate of suitable metal which is kept at a temperature sufficient to effect or initiate destruction of the intersheet to the depth to which the plate is introduced between the sheets of glass. Relative movement of the glass and the heated plate is effected in any convenient manner so that the destruction of the intersheet is carried on progressively along the edge of the laminated sheet. Preferably the heated plate is employed in the form of a thin disc or annulus which is rotated continuously but slowly and is continuously heated. It has been found by this method that the removal of the intersheet can be effected without heating the glass itself to such an extent as to cause breakage. If there remain in the crevice any particles of matter resulting from the combustion of the intersheet they are found to be of such a character that they can be brushed out or washed out readily.

The invention will be more fully explained hereinafter with reference to the accompanying drawing in which is illustrated an apparatus adapted for the practice of the invention. In the drawing—

Figure 1 is a view in elevation of such an apparatus as seen from the right hand in Figure 2, the gear casing being shown in section and a portion of a sheet of laminated glass being shown in position on the apparatus.

Figure 2 is a view partly in vertical central section on a plane at right angle to that of Figure 1 and partly in elevation.

The apparatus illustrated in the drawing comprises a suitable standard $a$ which supports bearings $b$, $b^1$, in which is mounted a shaft $c$. The latter is shown as provided with a pulley $c^1$ which is operatively connected, as by a belt $d$, with a small pulley $e$ on a shaft $e^1$ mounted in suitable bearings in the standard $a$ and driven, through a worm and worm gear, shown at $f$, from a shaft $g^1$ of a motor $g$. The shaft is rotated somewhat slowly, preferably at a speed not exceeding 12 R. P. M.

On the shaft $c$ is fixed a carrier, preferably consisting of two parts $h$, $h^1$, which may be secured together by screws $h^2$, thus clamping between them a thin, annular metal plate $i$, which is of such thinness that it may enter the space between the sheets of glass, the sheets of glass and the laminated sheet being indicated at $k$. The carrier or holder $h$, $h^1$, preferably has substantial mass as shown, and is formed, as at $h^3$, with a supporting shoulder on which the laminated sheet may rest as it is moved along in relation to the plate $i$. A roller support may be provided, as at $l$, for the laminated plate at a point remote from the plate or annulus $i$.

Any convenient means may be provided for maintaining the plate $i$ at the required temperature, which is preferably somewhat under the temperature of red heat. In the apparatus shown two Bunsen burners $m$, suitably connected to a supply of fuel gas, are arranged to maintain the heating flames at opposite points of the circumference of the annulus $i$ so as to maintain the plate or disc or annulus steadily at the required temperature.

When the plate has been raised to the required temperature a laminated sheet $k$, in the hands of a workman, is passed over the heated plate $i$, which enters the space between the sheets of glass. Under proper conditions of operation the celluloid or other material of the intersheet burns with a clear, non-smoky flame to a depth determined by the projection of the heated plate into the space between the sheets of glass. Generally it will be found that the destruction or combustion of the intersheet is complete, nothing being left in the crevice. If, however, any particles are left in the crevice they can be brushed out or blown out or washed out or softened for easily removal with a suitable tool by a short soaking in hot water.

It will be understood that the invention can be practised with various forms of apparatus suited to the conditions of operation and that the invention is not restricted to the use of the particular form of apparatus shown and described herein for purposes of illustration and explanation of the nature of the invention.

I claim as my invention:

1. The improvement in the manufacture of laminated glass composed of two sheets of glass and an intersheet of non-brittle material, which consists in preparing the laminated glass for sealing at the edge by destroying the material of the intersheet by burning the material to the required depth at the edge of the laminated sheet.

2. The improvement in the manufacture of laminated glass composed of two sheets of glass and an intersheet of non-brittle material, which consists in preparing the laminated glass for sealing at the edge by destroying the material of the intersheet by burning the material to the required depth at the edge of the laminated sheet and clearing from the crevice thus formed the residue of the intersheet.

3. The improvement in the manufacture of laminated glass composed of two sheets of glass and an intersheet of non-brittle material, which consists in preparing the laminated glass for sealing at the edge by destroying the material of the intersheet by burning the material to the required depth at the edge of the laminated sheet and subjecting the crevice thus formed to the action of hot water and then clearing from such crevice the residue of the intersheet.

4. Apparatus for preparing laminated glass, composed of two sheets of glass and an intersheet of non-brittle material, for sealing at the edge, comprising a thin annular disc to enter between the sheets of glass at the edge, means to rotate the disc, and means to heat the disc to a temperature sufficient to destroy the intersheet to the required depth.

5. In the manufacture of laminated glass having layers of glass separated by a layer of cellulosic or other shatter preventing binding material, the process of removing a narrow edge strip of the binding material which comprises subjecting said strip to a substantially localized high temperature sufficient to cause substantially immediate burning thereof.

This specification signed this 4th day of February A. D. 1929.

EDWARD M. BALL.